Patented Oct. 21, 1952

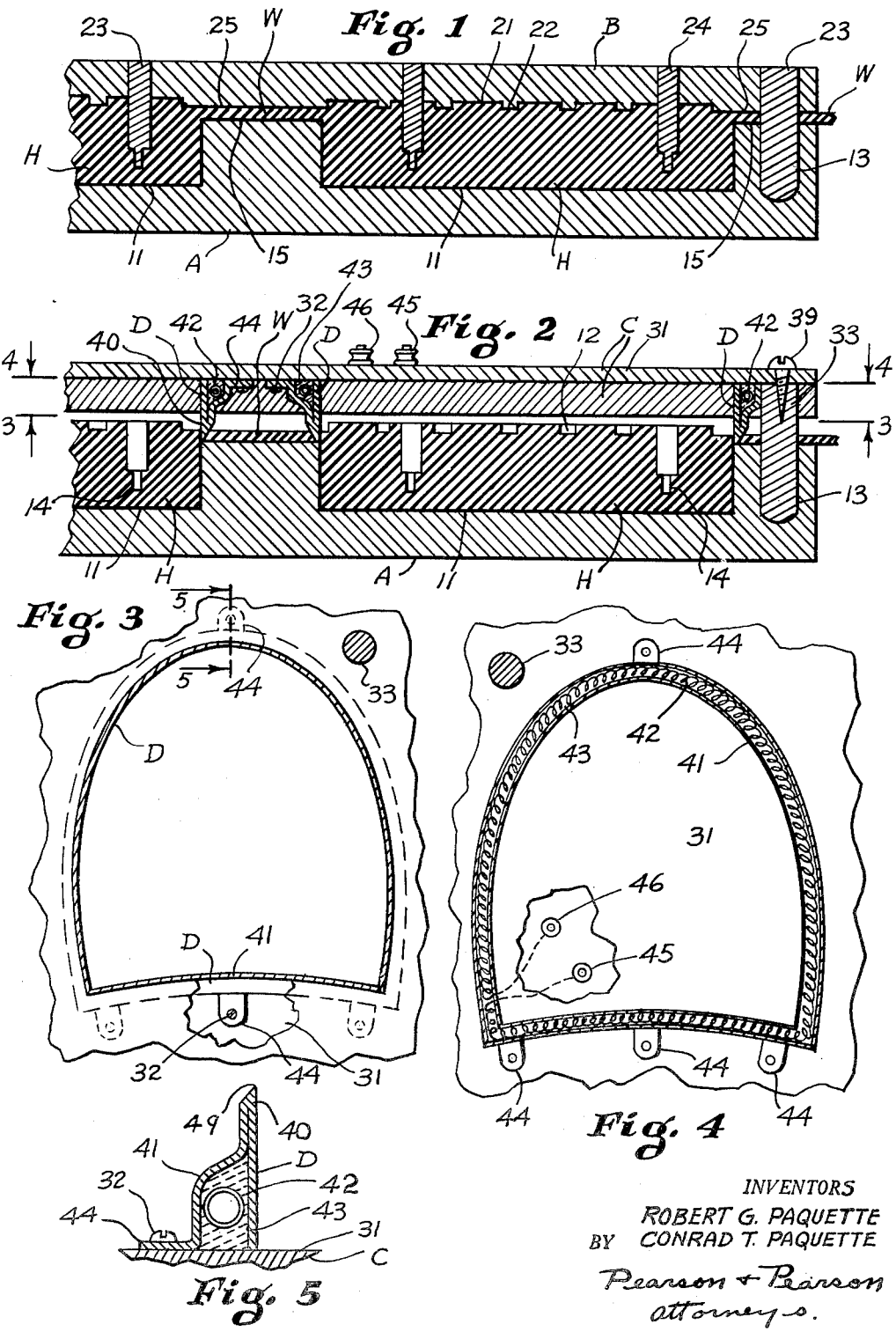

2,615,111

UNITED STATES PATENT OFFICE 2,615,111

TRIMMING DEVICE

Robert G. Paquette, Windsor, Vt., and Conrad T. Paquette, Claremont, N. H.

Application April 30, 1949, Serial No. 90,644

1 Claim. (Cl. 219—19)

This invention relates to the trimming or accurate removal of the web of excess material which is formed in a vulcanizing mold for rubber, rubber compound or similar material in the making of articles which are vulcanized under heat and pressure such as rubber heels.

Such articles are formed in cavities of the desired size and shape in a base plate or gang mold which may have twelve to twenty-four such cavities into each of which a slug or heel blank of unvulcanized material, such as rubber, is placed, all these slugs being then forced to conform to the inner shape of each mold cavity by great pressure, usually by an hydraulic press and at the same time or when squeezed into position being heated to the correct vulcanizing temperature for the particular compound. This is usually around 360 to 400 degrees Fahrenheit. A much greater temperature would result in the melting of the material and that is not the desired result.

Pressure is sometimes applied and released more than once and there is usually an excess of raw stock so that when pressure is applied, an excess of raw stock is squeezed out forming a web between the base or cavity plate and the cover or pressure plate. Ordinarily either the cover or the base plate or both are heated by contact with the top or bottom press plate or by other suitable means and the heat and pressure are retained until the stock is vulcanized.

The excess stock forms either a continuous or broken web between the cover plate and the base plate and must be removed so as to make a clean cut edge on the wearing face of such an article as a rubber heel. This wearing face is often formed with a trade-mark and ordinarily is formed with a number of nail holes each of which extends in from the wearing face to a washer imbedded in the stock so that an attaching nail can be driven in to its head which head rests against a washer.

Under present day conditions before vulcanizing, these washers are positioned in the right place in the stock by well known semi-automatic machinery and are vulcanized in place.

There have been many attempts to form a mold of two or three parts which could be so operated that the projecting web would be cut clean at the end of or during the vulcanizing process but these have not been successful. Where a three part mold has been used, it is found that the stock overflows and forms a web not only between the middle and top plates, but between the middle and bottom plates so that it has been necessary to remove both webs.

In actual practice, it has been found that the engagement of a cutting edge against a flat surface or a bevelled surface or a shearing cut between two sliding cutting edges does not accomplish the severance of a material such as vulcanized rubber. Such material is resilient and elastic and instead of being severed merely stretches or flows away from the cutting edges and snaps back to its former position after the cutting edge is removed. Furthermore, the cutting edges and opposed surface must be maintained in perfect contact when cutting and this proves to be extremely difficult in view of the great pressure necessary to cut a number of webs of vulcanized rubber contained in a gang mold. In addition such pressure may bend the cutting edges or damage the opposed surface thus producing imperfect articles.

For the above reasons and others, at present the usual method of trimming the web formed between the cover and base in making molded vulcanized rubber articles is to assign the task to individuals, equipped with manual or power cutters, who must carefully trim each article by hand. This is an expensive, time consuming process, and our invention is designed to eliminate the necessity for the same.

To accomplish the hand trimming, the usual method is to utilize air under high pressure through a thin narrow spout which is inserted along the edge of each cavity so that the air under pressure is forced under the vulcanized body of the heel until it is lifted above the surface together with the connecting web.

After that, the webs between the heels are cut or broken apart so that each hand trimmer can trim a single heel at a time.

The process which we utilize in our device is substantially a melting or softening and severing process which takes the place of cutting by shearing blades of hand trimmers or such blades as have been tried in the past in automatic constructions.

In our process, we release the hydraulic pressure, remove the cover plate and replace it with what we will call the trimmer plate so constructed with pins to fit in the same guide holes as the guide pins of the cover plate of the mold. This trimmer plate is provided with melting or trimming blades each to correspond exactly with the outer edge of the opening of each mold cavity in the base plate and each so formed that it can be heated by electricity to between 1400 and 1800 degrees Fahrenheit.

Our trimming blade is thus in the form of a closed figure or loop of thin metal, the shape or outline of which corresponds exactly to the desired outline of the finished rubber article. An electric resistance element, such as a coiled wire, is mounted around the blade, but is in the form of an open figure or loop so arranged as to heat the edges of the entire closed figure of metal forming the blade. No ribs or connecting fins are left between the web and article therefore, and the web is melted and completely severed at its base entirely around the molded article in one operation and simultaneously.

The trimmer plate and its trimmer blades are lowered until the edges are opposite to and flush with the outline of the molded article and resting on the web. As the edges have been or are now heated up to 1400 to 1800 degrees Fahrenheit, it is pressed down very lightly, as by the hands, and the edges melt their way through the web in a matter of seconds, thus severing the web and forming a neat, smooth edge which is finished and needs no trimming and no grinding.

The essence of our invention is that instead of punching, die cutting or shearing the web by the application of a damaging impact or great pressure, we use a heated endless trimming edge which severs by a combination of shearing and melting its way through the material. We prefer to use a hollow trimming member in which an electric coil is embedded in refractory cement and find that the best results are secured when the blade is heated to 1400 degrees to 1800 degrees Fahrenheit.

With our new heated trimming blades, no damaging pressure is necessary and the severance is accomplished by a rapid application and removal of the trimmer plate with the heated trimming blades by hand or otherwise, or under the pressure only of the weight of the trimmer plate. Our trimmer blades may be made of "Monel" metal open tubing pressed or formed into a substantially triangular shape, the exterior apex of the triangle forming a thin severing edge. We prefer to use a "Nichrome" steel electric heating coil embedded in a refractory cement which is located in the hollow or recess formed by the triangular or similarly shaped walls of our trimming blade.

In the drawings, Fig. 1 is an elevation in cross section of one type of gang mold showing rubber heels held in the cavity of a base plate and with a cover plate in position just after the completion of vulcanizing.

Fig. 2 is a view similar to Fig. 1, but showing our new trimmer plate replacing the cover plate and with the heated trimmer edges severing the web of excess material.

Fig. 3 is a plan view on line 3—3 of Fig. 2, of the under, or article contacting face, of our trimmer plate.

Fig. 4 is a plan view on line 4—4 of Fig. 2, in section, similar to Fig. 3, and showing the coil portion of our trimmer blade and Fig. 5 is a side elevation on line 5—5 of Fig. 3, showing the preferred form of our trimmer blade.

As shown in Fig. 1, A is the base plate of a gang mold of well known type and having cavities 11, 11 for the articles to be molded such as rubber heels H, H. B is the cover plate of the mold, also of a well known type and having depressions 21 or projections 22 for molding a tread design or trade-mark 12 in the finished rubber heel. Dowel pins or guides 23 are provided at suitable locations on the cover plate, such as at the corners, to coact with guide holes 13 in the stationary base plate A to properly align the two plates.

Pins 24 project downwardly from the cover plate A into the cavity 11, for receiving washers in a well known manner and forming the holes 14 in heels H.

In molding, a heel blank of raw stock is cut to size and placed in each cavity 11 of stationary base plate A. Movable cover plate B is then lowered on plate A with pins 23 entering guide holes 13 and pins 24 inserting washers in holes 14 in the raw stock. The mold is then placed in the vulcanizing apparatus, the pressure of which causes the raw stock to completely fill each recess of each cavity 11 and causes excess material to flow between the face 25 of plate B and face 15 of plate A, forming a relatively thin web W.

In our process, after the vulcanizing of heels H and consequent formation of web W, we remove cover plate B and substitute therefor our new trimmer plate C shown in Figs. 2, 3, and 4. Plate C includes dowel pins or guides 33, which fit exactly in guide holes 13 of plate A, the dowel pins being held in place in any suitable manner, such as by a screw 39.

As shown in Fig. 5, we prefer to provide a trimming blade D, formed with a severing portion 40 and a hollow, heating portion 41 forming a single piece of heat conducting metal such as "Monel" metal open tubing pressed or formed into a closed figure conforming to the desired shape. We may use the cross section shown or a generally triangular cross section for our trimming blade and it is obvious that it can be of any other convenient hollow cross section such as substantially circular provided there is an inner trimming edge 49 formed therein.

In a hollow heating portion 41, we place an electric heating element 42 consisting preferable of a "Nichrome" steel wire coil in the form of an open figure and embed the coil in a refractory cement 43 of any well known type. Wings or tabs 44 are also provided, integral with D, to permit fastening to a back plate 31 of plate C by screws 32.

Each of our trimming blades D is fixed in the correct position on back plate 31 of trimmer plate C so that when plate C is guided onto plate A, by pins 33 in holes 13, the edges 49 will be flush with the desired outline of a molded article such as H. The terminals 45 and 46 of heating element 42 are connected to a source of electromotive force, not shown, and the coil is heated to a temperature preferably between 1400 to 1800 degrees Fahrenheit, prior to contact with the web W.

In operation, our trimmer plate with its heated trimmer edges is quickly applied to the web W with light pressure of the hand of the operator. The heated trimmer edges sever the web W, from an article such as H by a combination of shearing and melting, leaving a clean smooth surface on the molded article. The plate C needs to be applied only momentarily and is quickly removed to avoid damaging the article H by excessive heat.

The finished vulcanized articles can now be removed in any suitable way.

We claim:

In a device for severing the excess web of rubber on the periphery of a molded rubber heel the combination of a stationary molding plate having a rubber heel cavity therein and a guide pin hole therein; a vertically movable trimmer plate having depending guide pins each engaged in one of said guide pin holes; a downwardly depending trimming blade, in the form of a closed figure exactly duplicating the periphery of said molded rubber heel, said trimming blade being folded outwardly and back upon itself to form a continuous recess and being fixed to said trimmer plate and an electric resistance coil, within said trimmer blade and imbedded in refractory cement entirely filling said continuous recess.

ROBERT G. PAQUETTE.
CONRAD T. PAQUETTE.

REFERENCES CITED

The following references are of record in the file of this patent:

UNITED STATES PATENTS

| Number | Name | Date |
|---|---|---|
| 1,410,615 | Snook | Mar. 28, 1922 |
| 1,449,445 | Rand | Mar. 27, 1923 |
| 1,555,284 | Hoey | Sept. 29, 1925 |
| 1,589,984 | Robinson | June 22, 1926 |
| 1,768,093 | Andre | June 24, 1930 |
| 1,947,857 | Krebs | Feb. 20, 1934 |
| 1,992,250 | Stacey | Feb. 26, 1935 |
| 2,110,985 | Jacobson | Mar. 15, 1938 |
| 2,490,781 | Cloud | Dec. 13, 1949 |